June 23, 1953 J. W. ZIMMER 2,642,700
STEERABLE TOY TRUCK
Filed July 7, 1950 2 Sheets-Sheet 1

Josef W. Zimmer,
Inventor,
Haynes and Koenig,
Attorneys.

June 23, 1953　　　　　J. W. ZIMMER　　　　　2,642,700
STEERABLE TOY TRUCK
Filed July 7, 1950　　　　　　　　　　　　　　2 Sheets-Sheet 2
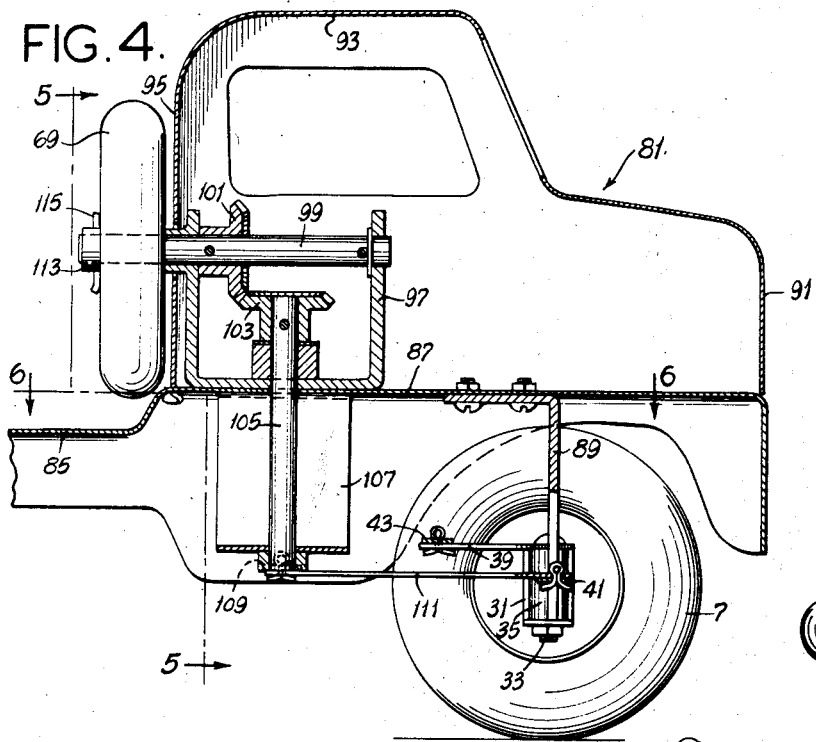
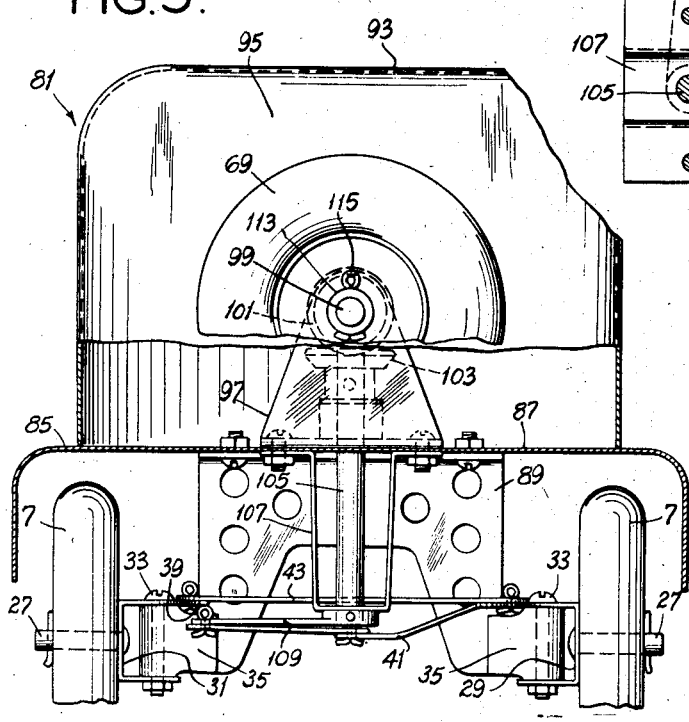
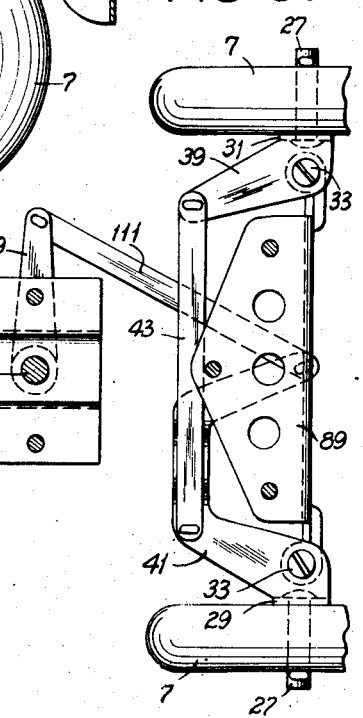
Josef W. Zimmer,
Inventor,
Haynes and Koenig,
Attorneys.

Patented June 23, 1953

2,642,700

UNITED STATES PATENT OFFICE 2,642,700

STEERABLE TOY TRUCK

Josef W. Zimmer, Glendale, Mo.

Application July 7, 1950, Serial No. 172,544

4 Claims. (Cl. 46—201)

This invention relates to toy trucks, and more particularly to toy truck models simulating closed-cab trucks of the type employed to haul truck-trailers.

The principal object of the invention is the provision of a toy closed-cab truck of the class described provided with steering gear operable from outside the cab of the truck without detracting from the simulation of commercial trucks. Commercial trucks of the type usually employed to haul truck-trailers have a chassis having front and rear wheels, with a closed cab at the forward end of the chassis, the chassis extending rearward from the cab for some distance with means for coupling a truck-trailer thereto at its rear end. Usually, a spare tire is mounted flat against the back of the cab. This invention, in general, comprises a toy truck simulating a commercial closed-cab truck having a chassis provided with front and rear wheels, and a closed cab at the front of the chassis. The front wheels are steerable. A steering rod extends generally horizontally from within the cab through the back of the cab. A steering wheel is fixed on the rod in back of the cab and closely adjacent thereto, in the position where the spare tire of a commercial truck is usually mounted. Steering gear is provided connecting the steering rod and the front wheels of the toy truck. This gear includes an element extending down through the bottom of the cab, and a linkage under the cab connecting this element and the front wheels. With this arrangement, the only part of the steering mechanism for the truck that is readily visible is the steering wheel at the back of the cab. Since this is located in the same position that the spare tire of a commercial truck is usually mounted, the toy truck of this invention closely simulates a commercial truck. Other features will be in part apparent and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which several of various possible embodiments of the invention are illustrated:

Fig. 4 is a longitudinal vertical section through the forward end of a second form of toy truck of this invention;

Fig. 5 is a vertical section taken on line 5—5 of Fig. 4; and

Fig. 6 is a horizontal section taken on line 6—6 of Fig. 4.

Similar reference characters indicate corresponding parts throughout the several views of the drawings.

Figure 1:
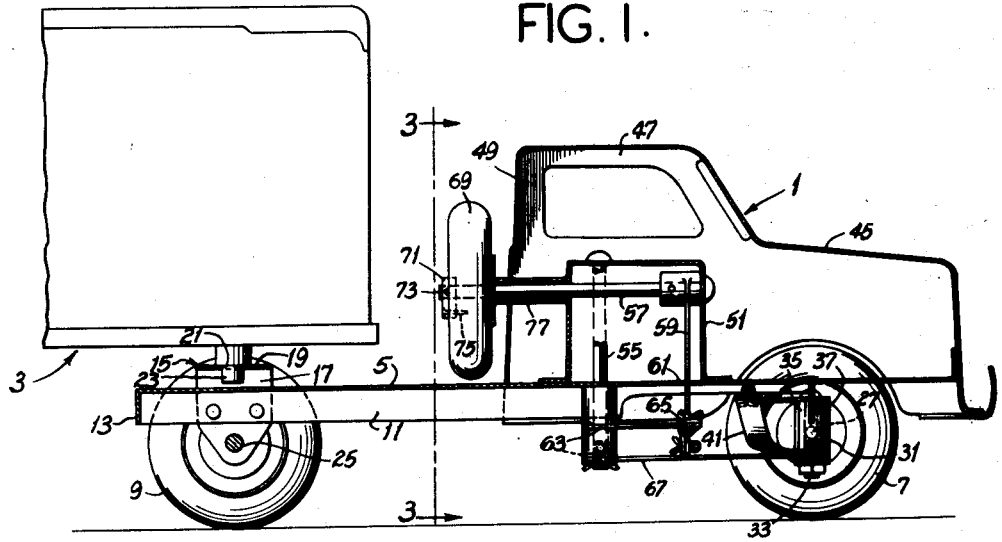
Fig. 1 is a longitudinal vertical section of a toy truck of this invention, illustrating in elevation the forward end of a toy truck-trailer as it is attached to the truck.
Figure 2:
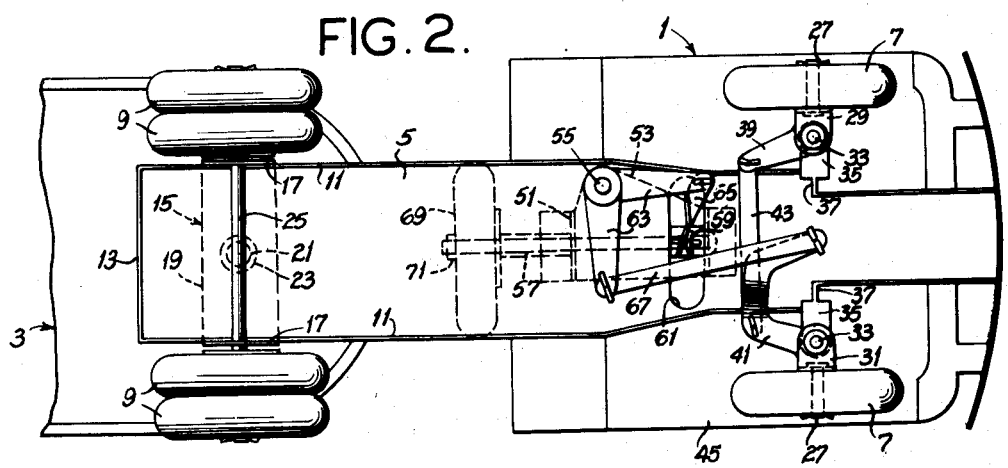
Fig. 2 is a bottom plan view of Fig. 1.
Figure 3:
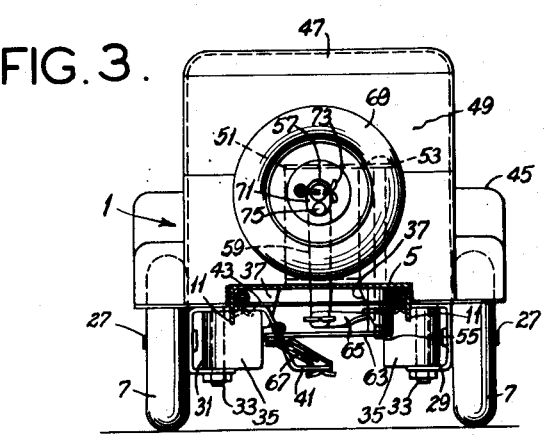
Fig. 3 is a vertical section taken on line 3—3 of Fig. 1.

Referring to Figs. 1 to 3 of the drawings, reference character 1 generally designates a toy truck of this invention in its entirety, and reference character 3 generally designates a toy truck-trailer coupled to the truck to be hauled thereby. The toy truck 1 is shown to comprise a chassis 5 having front wheels 7 and rear wheels 9. The chassis consists of a horizontal sheet metal plate bent to have downwardly extending side flanges 11 and a rear flange 13, with the side flanges terminating short of its front end. Adjacent the rear end of the chassis is a trailer coupling and rear axle mounting element 15. This consists of a sheet metal strap of generally inverted U-shape having sides 17 secured to the side flanges 11 of the chassis, and an upper horizontal part 19 elevated somewhat above the chassis. Part 19 has a central opening 21 for receiving a coupling pin 23 extending downward from the bottom of the trailer adjacent its front end. Sides 17 of the strap 15 extend below the chassis and carry a rear axle 25. This axle is fixed in the sides of the strap, and the rear wheels 9 are mounted for rotation on the ends of the axle, while being readily removable therefrom.

The front wheels 7 are mounted for rotation on stub spindles or axles 27 carried by right and left steering knuckles 29 and 31. The knuckles are formed from sheet metal stampings and each has a yoke pivoted to swing on a vertical axis by means of a pivot bolt 33 extending through a bearing block 35 carried by ears 37 bent down from the chassis plate. The knuckle 29 for the right front wheel has a knuckle arm 39 and the knuckle 31 for the left front wheel has a steering arm 41. Arms 39 and 41 are linked by a tie rod 43.

A housing 45, formed of sheet metal, and simulating the closed cab, hood, front fenders, etc. of a commercial truck is mounted on the chassis at its forward end. The cab part of this housing is designated 47. It has a back wall 49. The chassis 5 forms a floor for the cab. Housed in the cab is a bearing bracket 51 consisting of a sheet metal stamping of inverted U-shape mounted on the floor of the cab in the central vertical longitudinal plane of the truck. The top of the bracket has a sidewise extension 53. A headed pin 55 extends vertically downward from this extension through an opening in the floor of the cab. A steering rod 57 is journalled for rotation on a generally horizontal axis in the side members of the bracket just under its top, the rod extending longitudinally of the truck and extending out through an opening in the back wall 49 of the cab. A pitman arm 59 is fixed on the steering rod adjacent its forward end and extends down through an elongate transverse slot 61 in the floor of the cab. A bell crank lever 63 is mounted for rotation on a vertical axis on the lower end of the vertical pin 55 under the floor of the cab. One arm of the bell crank is linked to the lower end of the pitman arm 59 by a link 65. The other arm of the bell crank lever is linked to the steering arm 41 by a drag link 67. The connections of the link 65 to the pitman arm and the bell crank are such as to permit this link to rock in accordance with the arc described by the lower end of the pitman arm.

On the outer end of the steering rod 57 in the rear of and closely adjacent the back wall 49 of the cab is a steering wheel 69. As shown, this comprises a model truck wheel, like front and rear wheels 7 and 9, having a model rubber tire. The wheel is held on the outer end of the rod 57, while adapted readily to be removed, by means of a collar 71 retained on the end of the rod by a cotter pin 73. The collar is provided with a pin 75 extending into an opening in the hub of the wheel 69 to key the wheel to the steering rod 57. A sleeve 77 is provided on the rod 57 between the hub of the steering wheel and the rearward side of the bracket 51 to keep the steering wheel from sliding on the steering rod.

Figs. 4 to 6 illustrate a second toy truck of this invention, generally designated 81, in most respects like that shown in Figs. 1 to 3 except for some modifications in the steering gear. The toy truck 81 shown in Figs. 4 to 6 has a sheet metal plate chassis designated 85 which differs somewhat from a chassis 5 of the truck 1 shown in Figs. 1 to 3 in having a raised part 87 at its forward end forming the floor of the cab of the truck. The front wheels, axles, steering knuckles, bearing blocks and tie rod of the truck 81 are generally the same as those of the truck 1 and are given the same reference characters. Bearing blocks 35 of the truck shown in Figs. 4 to 6, however, are carried by a bracket 89 extending downwardly from the raised part 87 of the chassis. The housing 91 of the truck 81 is formed to simulate the closed cab and hood of a commercial truck, the cab being designated 93. In this form, as shown, the chassis 85 is formed with simulated front fenders. The back wall of the cab 93 is designated 95.

Housed in the cab 93 is a U-shaped sheet metal bracket 97 mounted on the floor of the cab in the central vertical longitudinal plane of the truck. A steering rod 99 is journalled for rotation on a generally horizontal axis in the sides of the bracket near their upper ends. The steering rod extends longitudinally of the truck and projects out through an opening in the back wall of the cab. A bevel gear 101 is fixed on the rod within the housing adjacent the rear side of the bracket 97. This meshes with a bevel gear 103 fixed on the upper end of a vertical shaft 105 journalled for rotation in an opening in the base of the bracket 97 and in the floor of the cab, and in an opening in the lower end of a U-shaped bearing member 107 fixed to the floor of the cab and extending downward therefrom. Fixed on the lower end of the shaft below the bottom of the bearing member is a pitman arm 109. This is linked to the steering arm 41 by a drag link 111. The truck 81 shown in Figs. 4 to 6 has a steering wheel 69 like that shown in Figs. 1 to 3 mounted on the outer end of the steering rod and held thereon by a collar 113 cotter pinned to the rod and having a pin 115 which extends into an opening in the steering wheel to key the steering wheel to the steering rod.

From the above, it will be seen that in each of the two forms of the invention shown, there is provided a steering rod extending generally horizontally from within the cab through the back of the cab, with a steering wheel fixed on the rod closely adjacent the back of the cab, with steering gear connecting the steering rod and the front wheels of the trucks, with the steering gear including an element extending down through the bottom of the cab and a linkage under the cab connecting this element and the front wheels. In the truck shown in Figs. 1 to 3, the element extending down through the floor of the cab is the pitman arm 59. In the form of the truck shown in Figs. 4 to 6, this element is the vertical shaft 105. In each case, the steering wheel is mounted flat against the back wall of the cab, in the position where on commercial trailer-hauling trucks there is usually mounted a spare tire. With the steering wheel in the form of a model rubber-tired truck wheel, the toy truck closely simulates the appearance of a commercial truck. By having the front and rear wheels and the steering wheel removable, it is possible to simulate the changing of tires, and this enhances the entertainment and instructional value of the truck. The truck may be manipulated in play to simulate such maneuvers of a commercial truck as are employed in backing up, parking, etc. It is contemplated that trucks of this invention may be used in playing a game based upon such driving tests as are given commercial truck drivers on a test range.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. A toy truck simulating a commercial closed-cab truck, comprising a toy chassis having removable model rubber-tired front and rear truck wheels, the front wheels being steerable, a closed cab at the forward end of the chassis, a steering rod extending substantially horizontally from within the cab through the back of the cab, a steering wheel removably mounted on the rod outside and in back of the cab immediately adjacent thereto and within the length of the chassis, said steering wheel comprising a model rubber-tired truck wheel like the front and rear wheels and simulating a spare tire, said steering wheel and said front and rear wheels being interchangeable, and steering gear interconnecting the steering rod and the front wheels.

2. A toy truck simulating a commercial closed-cab truck, comprising a toy chassis having front and rear wheels, the front wheels being steerable, a closed cab at the forward end of the chassis, the chassis forming a floor for the cab, a steering rod extending horizontally in the longitudinal central vertical plane of the truck from within the cab through the back of the cab, a steering wheel mounted on the rear end of the rod outside and in back of the cab immediately adjacent thereto and within the length of the chassis, and steering gear connecting the rod and the front wheels, said gear including an element extending down from the rod through an opening in the floor of the cab, and a linkage under the floor connecting said element and the front wheels.

3. A toy truck as set forth in claim 2 wherein the front wheels are carried by steering knuckles pivoted to swing on vertical axes, with a tie rod connecting the steering knuckles, and wherein the said element comprises a pitman arm fixed to the rod and extending downward therefrom through an elongate slot in the floor, and said linkage comprises a bell crank lever pivoted to swing on a vertical axis under the floor, a link connecting the pitman arm to one arm of the bell crank lever, and a drag link connecting the other arm of the bell crank lever to one of the steering knuckles.

4. A toy truck as set forth in claim 2 wherein the front wheels are carried by steering knuckles pivoted to swing on vertical axes, with a tie rod connecting the steering knuckles, and wherein the said element comprises a vertical shaft extending downward through the opening in the floor and geared at its upper end to the steering rod, and said linkage comprises a pitman arm at the lower end of the vertical shaft, and a drag link connecting the pitman arm to one of the steering knuckles.

JOSEF W. ZIMMER.

References Cited in the file of this patent

UNITED STATES PATENTS

| Number | Name | Date |
|---|---|---|
| 1,996,546 | Lindberg | Apr. 2, 1935 |
| 2,144,461 | Muller | Jan. 17, 1939 |
| 2,260,679 | Neilson | Oct. 28, 1941 |

FOREIGN PATENTS

| Number | Country | Date |
|---|---|---|
| 774,873 | France | 1934 |